(12) United States Patent
Lynaugh et al.

(10) Patent No.: US 6,782,335 B1
(45) Date of Patent: Aug. 24, 2004

(54) METHOD AND SYSTEM FOR ESTIMATING INPUT POWER IN A CABLE MODEM NETWORK

(75) Inventors: Kevin Lynaugh, Carlsbad, CA (US); Michael Andrew Grossman, San Diego, CA (US); Yong Huang Zeng, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/669,382

(22) Filed: Sep. 26, 2000

Related U.S. Application Data

(60) Provisional application No. 60/155,802, filed on Sep. 27, 1999.

(51) Int. Cl.$^7$ .............................................. G06F 19/00
(52) U.S. Cl. ........................... 702/107; 702/60; 702/75; 702/85
(58) Field of Search ............................ 702/107, 60, 61, 702/62, 85, 86, 75, 76, 106, 189; 455/69, 73, 88, 522

(56) References Cited

U.S. PATENT DOCUMENTS

| | | | | |
|---|---|---|---|---|
| 4,531,089 A | * | 7/1985 | Ishizuka et al. | 324/99 D |
| 4,829,380 A | * | 5/1989 | Iadipaolo | 348/678 |
| 5,027,376 A | * | 6/1991 | Friedman et al. | 375/240 |
| 5,048,054 A | * | 9/1991 | Eyuboglu et al. | 375/222 |
| 5,129,098 A | * | 7/1992 | McGirr et al. | 455/69 |
| 5,265,151 A | * | 11/1993 | Goldstein | 379/93.32 |
| 5,315,380 A | * | 5/1994 | Ingraham et al. | 358/500 |
| 5,339,109 A | * | 8/1994 | Hong | 348/441 |
| 5,452,473 A | * | 9/1995 | Weiland et al. | 455/88 |
| 5,465,205 A | * | 11/1995 | Kamiya | 700/37 |
| 5,469,115 A | * | 11/1995 | Peterzell et al. | 330/129 |
| 5,722,056 A | * | 2/1998 | Horowitz et al. | 455/126 |
| 5,764,546 A | * | 6/1998 | Bryant et al. | 702/108 |
| 5,793,815 A | | 8/1998 | Goodnow et al. | 375/286 |
| 6,072,902 A | * | 6/2000 | Myers | 382/167 |
| 6,118,811 A | * | 9/2000 | Narumi et al. | 375/219 |
| 6,131,023 A | * | 10/2000 | Matsuura | 455/301 |
| 6,148,047 A | * | 11/2000 | Mohindra | 375/346 |
| 6,240,551 B1 | * | 5/2001 | Webb et al. | 725/68 |
| 6,285,960 B1 | * | 9/2001 | Fung et al. | 375/240 |
| 6,539,128 B1 | * | 3/2003 | Lee et al. | 382/300 |
| 6,606,615 B1 | * | 8/2003 | Jennings et al. | 706/45 |

FOREIGN PATENT DOCUMENTS

| | | | | |
|---|---|---|---|---|
| JP | 04267613 A | * | 9/1992 | H03G/3/02 |

OTHER PUBLICATIONS

IBM Technical Disclosure Bulletin No. NN9312505, vol. 36, Issue 12, Dec. 1993.*
International Preliminary Examination Report, dated Jan. 17, 2002.

\* cited by examiner

*Primary Examiner*—Jeffrey R. West
(74) *Attorney, Agent, or Firm*—Steven L. Nichols; Ronald P. Kananen; Rader, Fishman & Grauer PLLC

(57) ABSTRACT

A method for estimating the input power to a cable modem includes generating a look-up table containing AGC integrator accumulator values corresponding to selected frequencies and amplitudes. The look-up table is generated by first constructing a calibration matrix by inputting a plurality of calibration signals having known input frequencies and known input power levels into the cable modem's receiver, and recording AGC integrator accumulator values corresponding to several frequencies and power levels over a selected operating range as calibration points. Next, an interpolation and extrapolation process generates the look-up values corresponding to the frequencies and amplitudes in between the calibration points. During modem operation, the modem estimates the input power by checking the AGC integrator accumulator value corresponding to the input frequency and amplitude. Because the look-up table values are based on the cable modem's actual operating characteristics, the estimated input power will reflect any variations or irregularities in the modem's operation, such as gain non-linearities, frequency ripple, or temperature effects.

40 Claims, 5 Drawing Sheets

Calibration Amplitude Points Na_cal

Pin (dBm)

Interpolated Amplitude Points, Na

Pin (dBm)

Calibration Frequency Points Nf_cal

Frequency (Hz)

Interpolated Frequency Points, Nf

Frequency (Hz)

METHOD AND SYSTEM FOR ESTIMATING INPUT POWER IN A CABLE MODEM NETWORK

RELATED APPLICATIONS

The present invention was also disclosed in a provisional patent application, Application No. 60/155,802, filed Sep. 27, 1999 from which priority is claimed under 35 U.S.C. § 119(e) and which is hereby incorporated by reference in its entirety.

TECHNICAL FIELD

The present invention relates to cable modem networks, and more particularly to input power estimation methods that compensate for variations in tuner gain characteristics.

BACKGROUND ART

Digital modems are increasingly being used by consumers as cable modem network service providers obtain additional subscribers. Cable modem devices designed for the mass-market are designed to be affordable to as many consumers as possible. However, low-cost, high production devices manufactured for the mass consumer market often exhibit variations and irregularities in their operating characteristics, such as gain non-linearities, frequency ripple and temperature effects. These variations make it difficult to measure the radio frequency (RF) input power to the cable modem accurately.

Currently known calibration solutions do not address variations in the tuner gain and intermediate frequency (IF) amplifier gain in the tuner of the cable modem as the frequency and power level of the input signal changes. Further, any calibration method that applies the same parameters globally to all cable modem devices does not consider the fact that individual devices may exhibit slightly different operating characteristics and may have different irregularities. These variations may adversely affect the cable modem's performance if not adequately addressed via an accurate input RF power determination.

Although it is theoretically possible to use the cable modem to calculate data that will compensate for variations in tuner gain characteristics, this would require incorporating additional calculation circuitry into the cable modem, increasing the cable modem's complexity and generating a device that is likely to be too expensive for the mass consumer market.

There is a need for a simple method and system to correct for variations and irregularities that are commonly encountered in low-cost, high volume cable modems when estimating input power to the cable modem.

SUMMARY OF THE INVENTION

Accordingly, the present invention is directed to a method for estimating input power to a cable modem device having a tuner and a modem. The method includes generating a look-up table that contains look-up values used to compute an estimated input power to the modem's receiver. The look-up table is stored in the modem for reference. The method includes inputting a plurality of calibration signals having known input frequencies and known input power levels into the device's receiver, recording a calibration point corresponding to each of the calibration signals in a calibration matrix, and interpolating the calibration points in said calibration matrix to generate the look-up table values.

A cable modem device according to the claimed invention has the look-up table stored in the modem, preferably as 8-bit data. During modem operation, the modem checks the frequency of an input signal received by the modem's receiver, checks an accumulated value of an integrator, checks the look-up table for the look-up value corresponding to the frequency and accumulated integrator value, and uses the look-up value to determine an estimated input power. Because the look-up table values are derived from the cable modem device's actual operating characteristics, the input power estimate will reflect any variations or irregularities in the specific device being used.

DETAILED DESCRIPTION OF THE PREFERRED EMBODIMENTS

Figure 1:
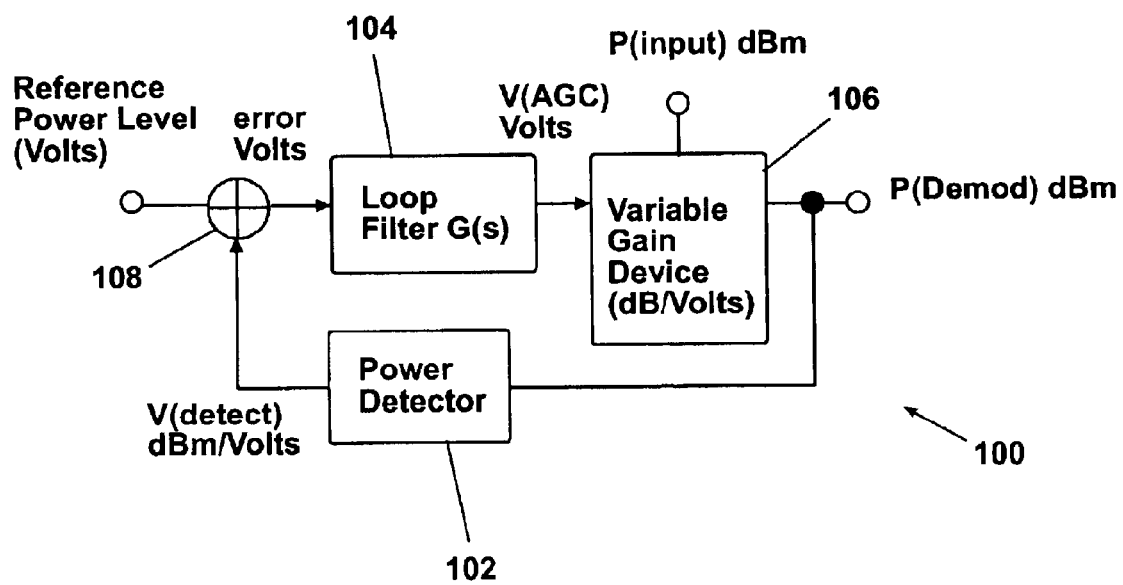
FIG. 1 is a representative block diagram illustrating an automatic gain control loop that is used in conjunction with the inventive method.

FIG. 1 is a block diagram representing an automatic gain control (AGC) 100 circuit that is used to generate information to be used for computing input RF power. An AGC circuit is found in the integrated circuit of known digital modems. The AGC circuit 100 includes a power detector 102, a loop filter having gain G(s) 104, and a variable gain device 106, such as a voltage variable amplifier, as well as an adder/subtractor 108 located at input of the filter 104. The AGC circuit 100 is used to adjust the gains of the receiver and intermediate frequency (IF) stages of the tuner in the cable modem to maintain a constant receiver power output. As can be seen in FIG. 1, the AGC circuit 100 has a closed loop, negative feedback control system configuration, which ensures that the power output of the receiver remains constant.

The relationship between the power out of the receiver of the AGC circuit 100, $P_{demod}$(dBm) and the input power $P_{input}$(dBm) can be generally defined as follows:

$$P_{Demod}(dBm) = P_{INPUT}(dBm) + G_{Receiver}(dB) \quad (1)$$

where $G_{Receiver}$(dB) is the gain of the receiver.

If a voltage variable amplifier (VVA) is used as the variable gain device 106, the expression for the receiver output power can be as follows:

$$P_{Demod}(dBm) = P_{INPUT}(dBm) + V_{AGC}(V/dB) \cdot K_{VVA}(dB/Volt) + G_{Receiver}(dB) \quad (2)$$

where $V_{AGC}$(V/dB) is the voltage applied to the voltage variable gain device 106 and $K_{VVA}$(dB/Volt) is a constant depending on the characteristics of the VVA.

One specific embodiment, to be used in a digital AGC circuit implementation, is to use digital integrators for accumulating the AGC error signals. The accumulated value of the AGC's integrator register is proportional to the voltage applied to the voltage variable gain device 106 once the loop has reached equilibrium, as indicated by the following expression:

$$V_{AGC}(V/dB) \propto \Psi_{IntAccumValue}(bits) \cdot K_{\Sigma\Delta}(Volts/Bits) \quad (3)$$

Where $K_{\Sigma\Delta}$ is a constant.

Combining the information in Equations 2 and 3 results in the following expression:

$$P_{Demod}(\text{dBm}) = P_{INPUT}(\text{dBm}) + \Psi_{IntAccumValue}(\text{bits}) \cdot K\Sigma\Delta(\text{Volts/Bits}) \cdot K_{VVA}(\text{dB/Volt}) + G_{Receiver}(\text{dB}) \quad (4)$$

As can be seen in Equation 4, the input power $P_{input}(\text{dBm})$ of the receiver can be obtained for any given accumulated value of the AGC integrator $\Psi_{acc}$.

Figure 2:
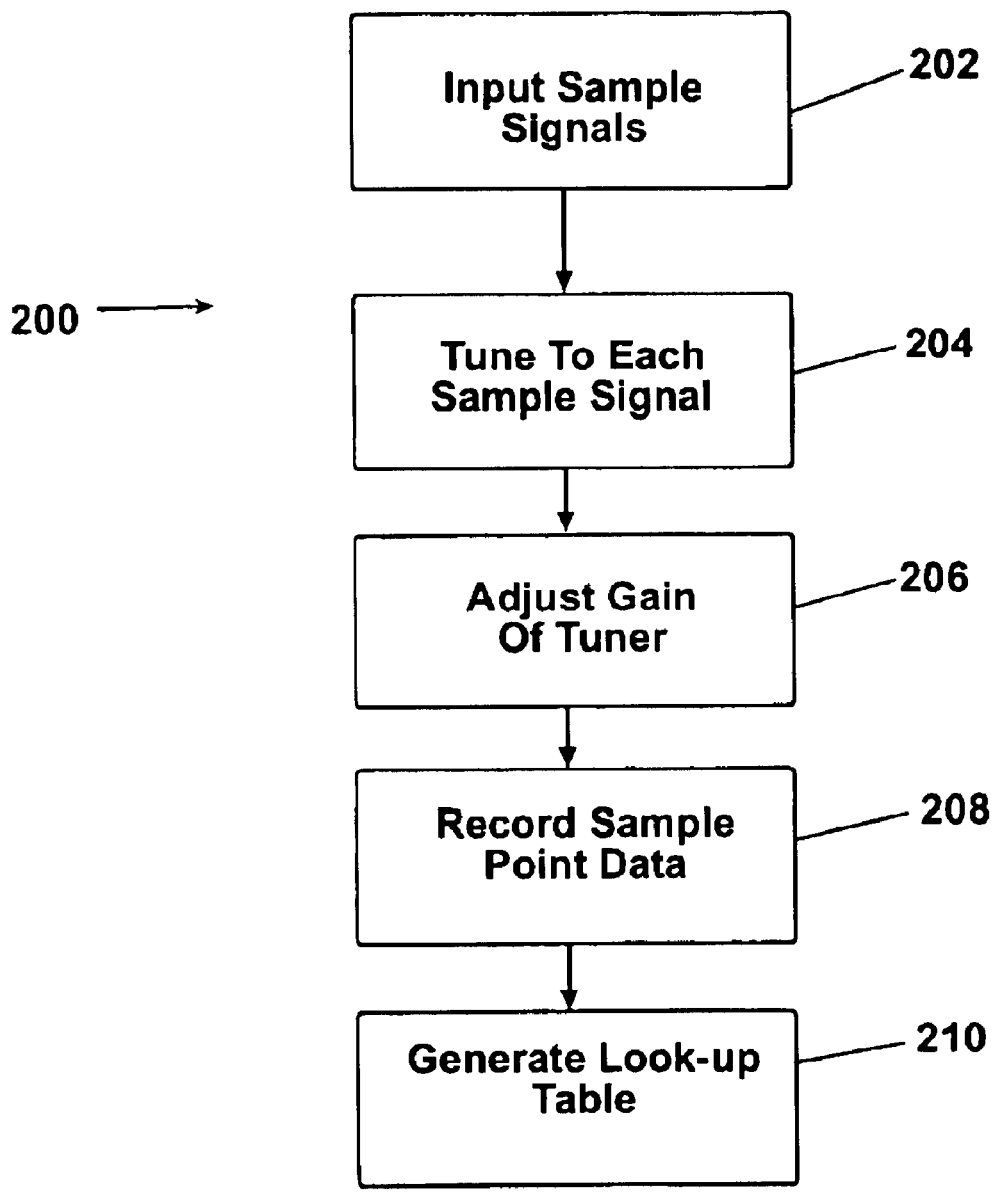
FIG. 2 is a flowchart illustrating one embodiment of the inventive method.

The specific manner in which the accumulated value in the AGC integrator is used to compute the receiver's input power will be explained with reference to FIG. 2. FIG. 2 is a flowchart that illustrates one embodiment of the inventive method 200. As noted above, the inventive method uses the AGC integrator's accumulated value and estimates the input RF power using an algorithm and look-up table. The look-up table itself is preferably generated during a production phase, after the digital modem and tuner in the cable modem device have already been manufactured and connected together. During the production phase, a selected number of sample signals having a known power level and frequency are applied to the tuner input at step 202. Each sample signal will act as a sample point for generating a calibration matrix corresponding with that specific cable modem device. Preferably, the sample points include multiple power levels over the same frequency as well as multiple frequencies for the same power level. Of course, if greater accuracy is desired, more sample points can be taken, but doing so will increase the time and expense required for calibration.

Next, the tuner in the cable modem device tunes to each sample signal at step 204 and the AGC loop adjusts the gain of the tuner at step 206 for each signal. For each sample point, the input power Pin, input frequency Fin, and the AGC integrator accumulated value $\Psi_{acc}$ are recorded at step 208. For explanatory purposes, the term "Na" refers to amplitude points in the matrix (with "Na_cal" referring to amplitude points obtained during calibration) and the term "Nf" refers to frequency points (with "Nf_cal" referring to frequency points used during calibration). The calibration points are preferably taken over a large frequency and amplitude range to ensure that the sample points reflect the device's operating characteristics. For example, the inventive method may obtain nine amplitude samples (Na_cal=9) over 27 dB and ten calibration frequencies (Nf_cal=10) over 764 MHz.

Figure 3A:
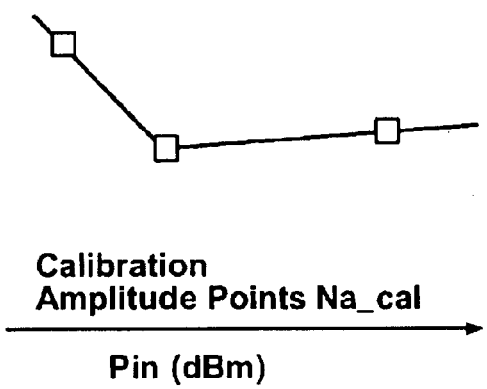
FIGS. 3a and 3b illustrate an example of generating amplitude points in a look-up table from calibration data.
Figure 3B:
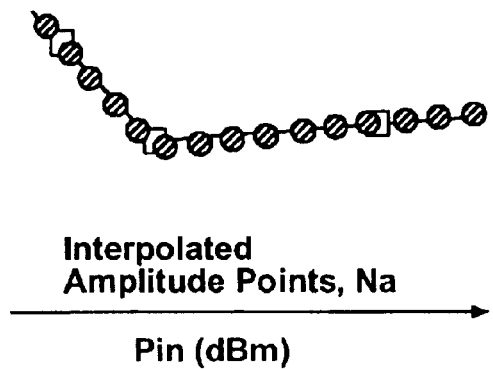

After the calibration data has been obtained and recorded, the inventive method generates a look-up table corresponding to the specific cable modem device at step 210 from the calibration data. Examples of how data in the look-up table is generated are shown in FIGS. 3a and 3b (amplitude) and FIGS. 4a and 4b (frequency). The objective of the look-up table is to provide a look-up value for each channel frequency and amplitude value that may be encountered by the cable modem. The specific amount of data in the look-up table can vary depending on the desired resolution. For example, using the example above, if the desired resolution includes a data point every 1 dB of amplitude and every 6 MHz of frequency, the final look-up table will be a matrix having dimensions Na=31 points by Nf=134 points.

Figure 4A:
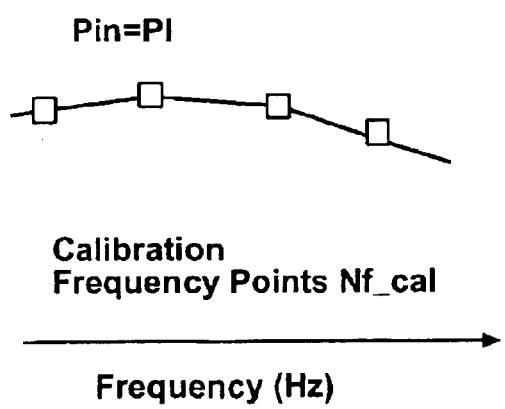
FIGS. 4a and 4b illustrate an example of generating frequency points in a look-up table from calibration data.
Figure 4B:
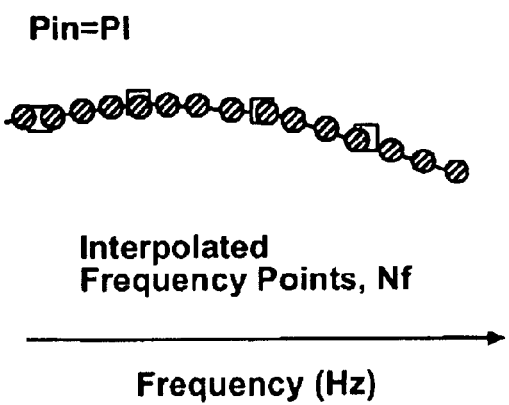

To calculate the values for the look-up table from the calibration points, the method includes interpolating between the AGC integrator accumulated $\Psi_{acc}$ for selected amplitude points at a selected frequency during step 210. An example is illustrated in FIGS. 3a and 3b. The interpolation itself can be conducted using a first or second order equation to fit a curve along the calibration data points to reduce RMS errors. Other interpolation and calibration techniques for linking the calibration points include using an audio tone to reduce the calibration errors caused by modulated signal fluctuations. For multi-band receivers, the inventive method may localize the calibration slope to reduce errors even further. Also, the calibration data can be fitted to known voltage variable amplifier curves to reduce the number of calibration points needed to obtain values for the components' RF tuner gains and IF gain amplifiers. Similarly, additional frequency points can be obtained via interpolation and extrapolation, as shown in FIGS. 4a and 4b, and stored in the look-up table.

After all of the desired points have been generated from interpolating and extrapolating the calibration data, the resulting look-up table preferably contains one AGC integrator accumulator value data point for each amplitude and frequency value in the tuner's operating range. When a user wishes to measure the input RF power to the modem's receiver, the current AGC integrator accumulator value $\Psi_{acc}$ is matched with the closest AGC integrator accumulator value $\Psi_{acc}$ corresponding to the tuner's frequency from the look-up table and thereby used to obtain an estimate of the input power. Because the AGC integrator accumulator values in the look-up table are obtained via the modem's actual operating characteristics, the values in the look-up table will reflect and compensate for any variations in the particular device's characteristics, such as gain non-linearity, frequency ripple, or temperature effects, in the input power calculation.

Figure 5:
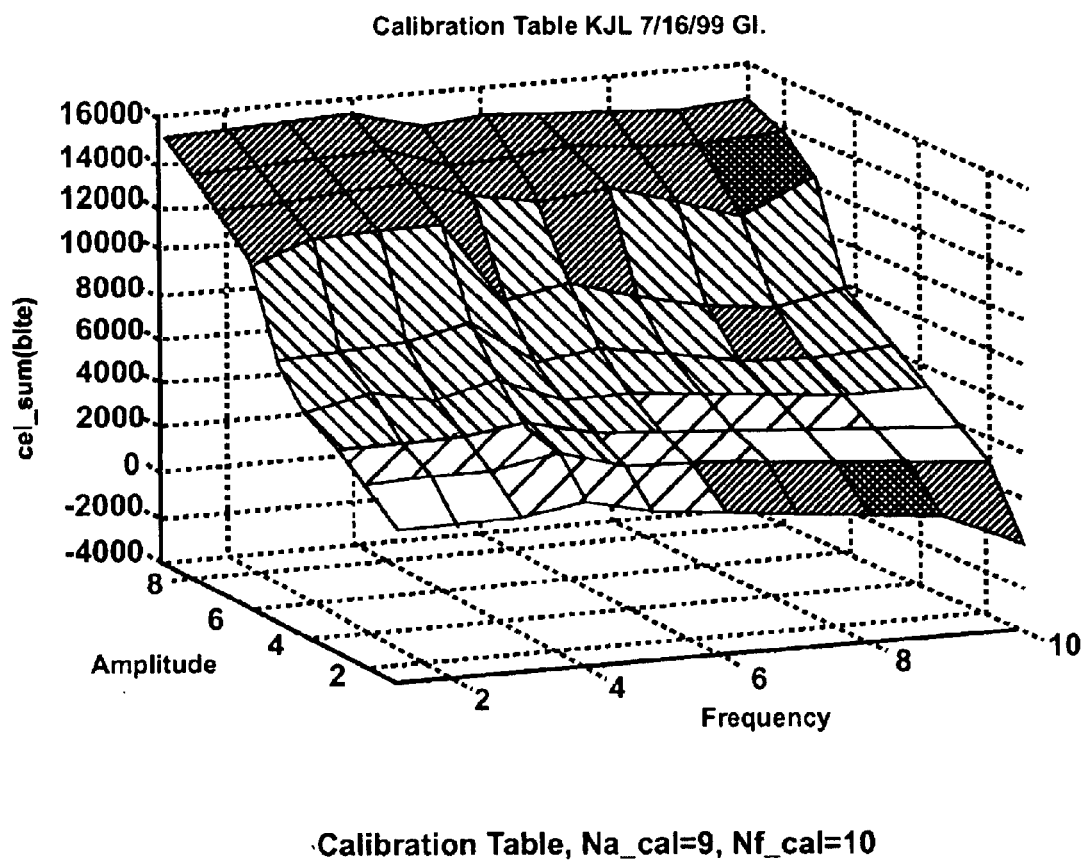
FIG. 5 is a graphical representation of calibration data according to the present invention.
Figure 6:
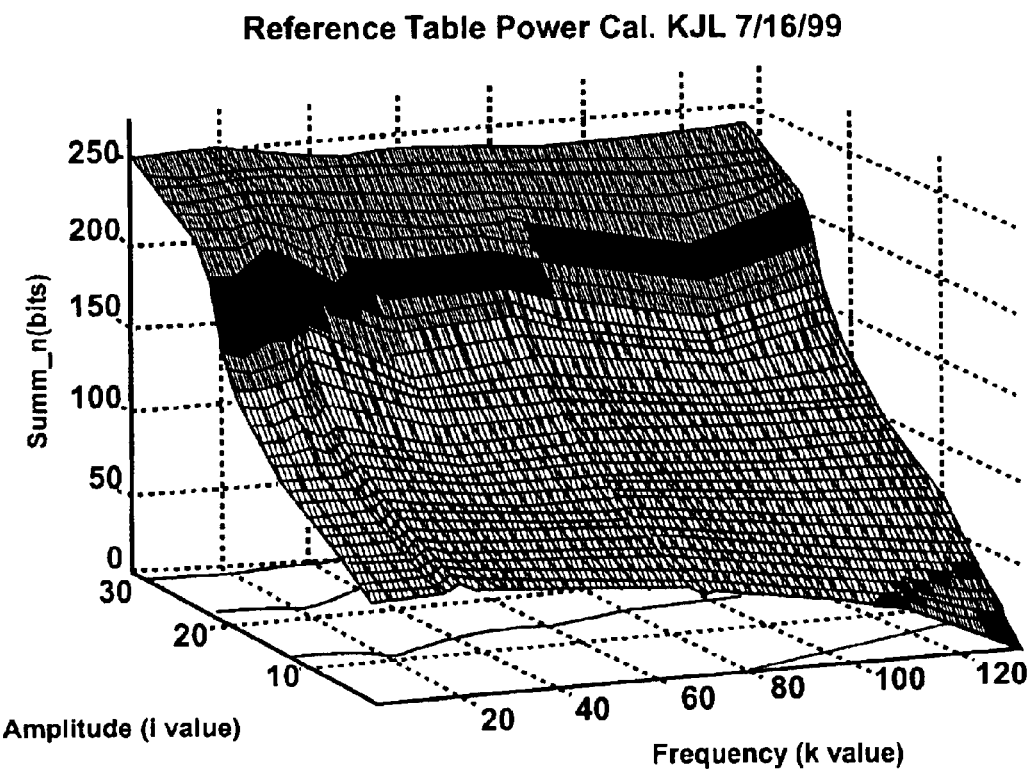
FIG. 6 is a graphical representation of a look-up table according to the present invention.

FIGS. 5 and 6 are three-dimensional graphical representations of the data generated and used by the inventive method. FIG. 5 is an example of a calibration table for a specific cable modem, while FIG. 6 is an example of a look-up table that is stored in the cable modem. As can be seen in the Figures, FIG. 6 provides a finer, more detailed representation of the plot shown in FIG. 5, which primarily acts as a framework for the look-up table. In FIGS. 5 and 6, amplitude and frequency are shown on the horizontal axes, while the AGC integrator accumulator value $\Psi$acc is shown on the vertical axis (cel_sum(bite); FIG. 5, or Summ_n (bits); FIG. 6). If desired, the dynamic range of the look-up table can be rescaled to accommodate a greater range frequency and/or amplitude values by setting maximum and minimum values for the look-up table.

To save digital memory, the look-up table values are preferably normalized to 8-bits to conserve memory space. The maximum and minimum values can be used to scale the stored 8-bit values to their actual AGC integrator accumulator values $\Psi_{acc}$.

As a result, the inventive method does not require any input power calculations to be conducted in the digital modem itself. Instead, the invention uses AGC accumulator register values in a digital demodulator to estimate input RF power using a simple algorithm and a look-up table, using external test equipment to generate the look-up table data stored in the modem. The data in the look-up table is preferably generated externally by interpolating and/or extrapolating points from sparse calibration data and stored in the modem using a compact format (e.g., 8-bit data). During operation, the modem simply references the data corresponding to the input frequency and to the closest AGC integrator accumulator value in the look-up table to obtain an associated input power value. Because the AGC integrator accumulator values in the look-up table are interpolated from the actual, device-specific operating characteristics of the tuner in the cable modem device, the inventive method can compensate for gain non-linearity, frequency ripple and temperature effects often found in low-cost RF tuners by including data corresponding to these effects in the look-up table, without requiring an excessive number of calibration points to generate the look-up table data.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method for estimating input power in a cable modem device having a tuner and a modem, the modem having a receiver including an automatic gain control (AGC) circuit with an integrator outputting an accumulated error value, the method comprising the steps of:

inputting a plurality of calibration signals having known frequencies and input power levels into the receiver;

recording calibration data corresponding to each of said plurality of signals, said calibration data including an associated frequency, input power level and accumulated error value for each of said calibration signals;

generating a look-up table comprising an interpolated accumulated error value for each of a desired set of estimated input power levels and input frequencies using said calibration data;

storing the look-up table in the modem; and obtaining an estimated input power using a current input frequency and an interpolated accumulated error value that is closest to a current accumulated error value as inputs to said look-up table.

2. The method of claim 1, wherein generating a look-up table comprises interpolating additional calibration data using calibration data taken from actual operation of said modem.

3. The method of claim 2, wherein the interpolating step is conducted using a first order equation.

4. The method of claim 2, wherein the interpolating step is conducted using a second order equation.

5. The method of claim 1, further comprising extrapolating additional calibration data from the calibration data obtained from actual operation of said modem.

6. The method of claim 5, wherein the extrapolation step is conducted using linear projection from a localized amplitude corresponding to a selected calibration frequency.

7. The method of claim 6, wherein the extrapolation step is repeated for each calibration frequency.

8. The method of claim 1, wherein generating said look-up table further comprises rendering said calibration data as 8-bit data.

9. A cable modem device, comprising:

a tuner that tunes to an input signal;

a modem coupled to the tuner, the modem having a receiver with an automatic gain control (AGC) circuit and a memory; and a look-up table stored in the memory, the look-up table comprising an interpolated accumulated error value for said AGC circuit for each of a desired set of estimated input power levels and input frequencies;

wherein said look-up table is used to compute an estimated input power to the receiver using a current input frequency and an interpolated accumulated error value that is closest to a current accumulated error value.

10. The cable modem device of claim 9, wherein data in said look-up table is stored in the memory as 8-bit data.

11. The cable modem device of claim 9, wherein said look-up table is generated from actual operation of said modem.

12. A method for estimating input power in a cable modem device having a tuner and a modem, the modem having a receiver including an automatic gain control (AGC) circuit with an integrator outputting an accumulated error value, the method comprising the steps of:

inputting a plurality of calibration signals having known frequencies and input power levels into the receiver;

recording calibration data corresponding to each of said plurality of signals, said calibration data including an associated frequency, input power level and accumulated error value for each of said calibration signals;

generating a look-up table comprising an interpolated accumulated error value for each of a desired set of estimated input power levels and input frequencies using said calibration data; and storing the look-up table in the modem;

wherein generating a look-up table comprises interpolating additional calibration data using calibration data taken from actual operation of said modem; and wherein the interpolating step is conducted using an audio tone.

13. The method of claim 12, further comprising obtaining an estimated input power using a current input frequency and an interpolated accumulated error value that is closest to a current accumulated error value as inputs to said look-up table.

14. The method of claim 12, further comprising extrapolating additional calibration data from the calibration data obtained from actual operation of said modem.

15. The method of claim 14, wherein the extrapolation step is conducted using linear projection from a localized amplitude corresponding to a selected calibration frequency.

16. The method of claim 15, wherein the extrapolation step is repeated for each calibration frequency.

17. The method of claim 12, wherein generating said look-up table further comprises rendering said calibration data as 8-bit data.

18. The method of claim 17, wherein generating said look-up table further comprises identifying a maximum value and a minimum value for frequency and input power level, wherein said maximum and minimum values are used to scale the 8-bit data.

19. A method for estimating input power in a cable modem device having a tuner and a modem, the modem having a receiver including an automatic gain control (AGC) circuit with an integrator outputting an accumulated error value, the method comprising the steps of:

inputting a plurality of calibration signals having known frequencies and input power levels into the receiver;

recording calibration data corresponding to each of said plurality of signals, said calibration data including an associated frequency, input power level and accumulated error value for each of said calibration signals;

generating a look-up table comprising an interpolated accumulated error value for each of a desired set of estimated input power levels and input frequencies using said calibration data; and storing the look-up table in the modem;

wherein generating a look-up table comprises interpolating additional calibration data using calibration data taken from actual operation of said modem; and wherein the interpolating step is conducted using a known voltage variable amplifier curve.

20. The method of claim 19, further comprising obtaining an estimated input power using a current input frequency and an interpolated accumulated error value that is closest to a current accumulated error value as inputs to said look-up table.

21. The method of claim 19, further comprising extrapolating additional calibration data from the calibration data obtained from actual operation of said modem.

22. The method of claim 21, wherein the extrapolation step is conducted using linear projection from a localized amplitude corresponding to a selected calibration frequency.

23. The method of claim 12, wherein the extrapolation step is repeated for each calibration frequency.

24. The method of claim 19, wherein generating said look-up table further comprises rendering said calibration data as 8-bit data.

25. The method of claim 24, wherein generating said look-up table further comprises identifying a maximum value and a minimum value for frequency and input power level, wherein said maximum and minimum values are used to scale the 8-bit data.

26. A method for estimating input power in a cable modem device having a tuner and a modem, the modem having a receiver including an automatic gain control (AGC) circuit with an integrator outputting an accumulated error value, the method comprising the steps of:

inputting a plurality of calibration signals having known frequencies and input power levels into the receiver;

recording calibration data corresponding to each of said plurality of signals, said calibration data including an associated frequency, input power level and accumulated error value for each of said calibration signals;

generating a look-up table comprising an interpolated accumulated error value for each of a desired set of estimated input power levels and input frequencies using said calibration data; and storing the look-up table in the modem.

wherein generating said look-up table further comprises identifying a maximum value and a minimum value for frequency and input power level, wherein said maximum and minimum values are used to scale data in said look-up table.

27. The method of claim 26, further comprising obtaining an estimated input power using a current input frequency and an interpolated accumulated error value that is closest to a current accumulated error value as inputs to said look-up table.

28. The method of claim 26, wherein generating a look-up table comprises interpolating additional calibration data using calibration data taken from actual operation of said modem.

29. The method of claim 28, wherein the interpolating step is conducted using a first order equation.

30. The method of claim 28, wherein the interpolating step is conducted using a second order equation.

31. The method of claim 28, wherein the interpolating step is conducted using an audio tone.

32. The method of claim 28, wherein the interpolating step is conducted using a known voltage variable amplifier curve.

33. The method of claim 26, further comprising extrapolating additional calibration data from the calibration data obtained from actual operation of said modem.

34. The method of claim 33, wherein the extrapolation step is conducted using linear projection from a localized amplitude corresponding to a selected calibration frequency.

35. The method of claim 34, wherein the extrapolation step is repeated for each calibration frequency.

36. The method of claim 26, wherein generating said look-up table further comprises rendering said calibration data as 8-bit data.

37. A cable modem device, comprising:

a tuner that tunes to an input signal;

a modem coupled to the tuner, the modem having a receiver with an automatic gain control (AGC) circuit and a memory; and a look-up table stored in the memory, the look-up table comprising an interpolated accumulated error value for each of a desired set of estimated input power levels and input frequencies;

wherein said look-up table is used to compute an estimated input power to the receiver using a current input frequency and an interpolated accumulated error value that is closest to a current accumulated error value; and wherein the memory also contains a maximum value and a minimum value for input frequency and input power level, wherein said maximum and minimum values are used to scale data in said look-up table.

38. The cable modem device of claim 37, wherein data in said look-up table is stored in the memory as 8-bit data.

39. The cable modem device of claim 37, wherein said look-up table is generated from actual operation of said modem.

40. A method for estimating input power in a cable modem device having a tuner and a modem, the modem having a receiver including an automatic gain control (AGC) circuit with an integrator outputting an accumulated error value for said AGC, the method comprising the steps of:

inputting a plurality of calibration signals having known frequencies and input power levels into the receiver;

recording calibration data corresponding to each of said plurality of signals, said calibration data including an associated frequency, input power level and accumulated error value for said AGC for each of said calibration signals;

generating a look-up table comprising an interpolated accumulated error value for said AGC for each of a desired set of estimated input power levels and input frequencies using said calibration data;

storing the look-up table in the modem; and obtaining an estimated input power using a current input frequency and an interpolated accumulated error value that is closest to a current accumulated error value as inputs to said look-up table.

* * * * *